J. LUZNICKY.
WAGON BRAKE.
APPLICATION FILED JAN. 16, 1909.
927,736.
Patented July 13, 1909.
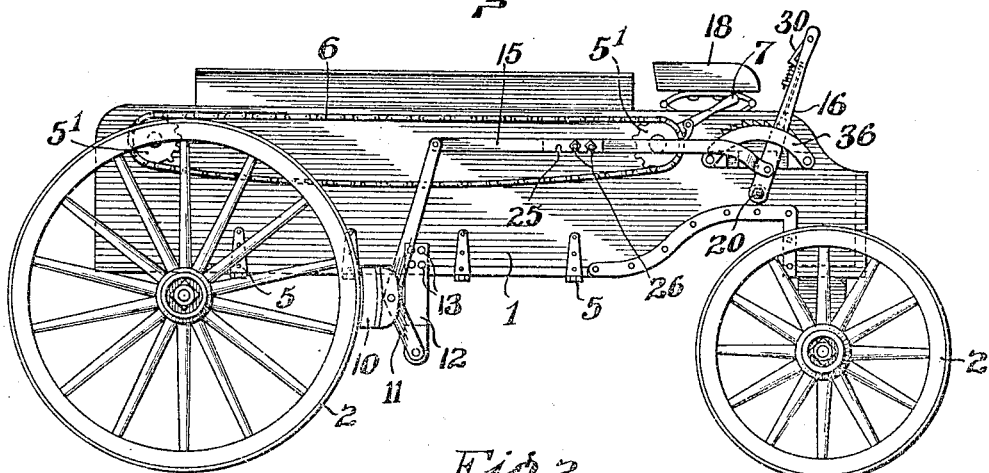
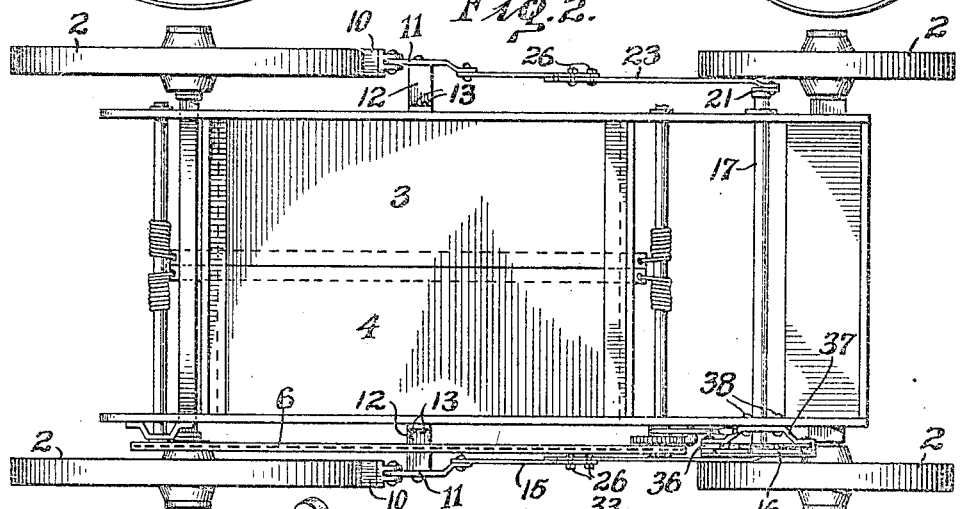
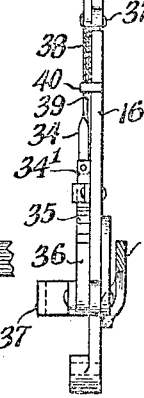
Witnesses
Daniel Webster, Jr.
A. T. Gardner
Inventor
John Luznicky
Attorney

UNITED STATES PATENT OFFICE.

JOHN LUZNICKY, OF PHILADELPHIA, PENNSYLVANIA.

WAGON-BRAKE.

No. 927,736.  Specification of Letters Patent.  Patented July 13, 1909.

Application filed January 16, 1909. Serial No. 472,578.

*To all whom it may concern:*

Be it known that I, JOHN LUZNICKY, a citizen of the United States, residing at Philadelphia, in the county of Philadelphia, State of Pennsylvania, have invented a new and useful Wagon-Brake, of which the following is a specification.

The main objects of this invention are to provide a simple, strong, durable and efficient brake that may be conveniently operated; to provide a brake that may be conveniently applied to an ordinary wagon or vehicle; to provide a brake which may be adjusted to take up any wear of the brake shoes, to keep the brake shoes and actuating levers of the brake normally in proper position; and to provide other improvements as will appear hereinafter.

In the accompanying drawings, Figure 1 is a side elevation of a wagon having a brake constructed in accordance with this invention applied thereto; Fig. 2 a top plan view of the same, the seat thereof being removed; Figs. 3 and 4 are a side elevation, and a rear elevation respectively of an improved actuating handle bar forming a part of the brake; and Fig. 5 is a fragmentary perspective of the shaft forming part of the brake.

Referring to the drawings, the wagon shown is of a well known type, having a body 1 mounted upon four wheels 2. The body of the wagon is provided with a bottom divided longitudinally into two sections 3 and 4, which are connected to the sides of the body by hinges 5. These bottom sections are arranged to open downwardly to empty the wagon and are controlled by means of the usual mechanism actuated by a pair of sprockets 5', connected by a sprocket chain 6, and controlled by a ratchet lever 7.

One embodiment of the improved brake comprises a brake shoe 10 arranged upon each side of the wagon in front of and adapted to engage the rear wheels. Each brake shoe is carried by a bell crank lever 11, to which it is attached adjacent and upon the convex side of the apex thereof. Each bell crank lever is pivoted at its lower end to the lower end of a bracket 12, which depends downwardly from the adjacent side of the body of the wagon, being rigidly connected to the body at its upper end by bolts 13, or other suitable means. The lower end of each bracket 12 is offset outwardly from the body of the wagon and is substantially in the plane of the adjacent rear wheel.

The upper end of the bell crank lever upon the right-hand side of the wagon is connected by means of a tie rod 15, to an actuating handle bar 16 which is rigidly mounted at its lower end upon a brake shaft 17, which extends transversely and rotatably through the sides of the wagon body in front of and below the seat 18.

The brake shaft 17 is preferably cylindrical in form and is provided at each end with a squared portion 18' terminating in a reduced cylindrical threaded end 19. The handle bar 16 is provided with a square aperture at its lower end and fits snugly over the right-hand end of the brake shaft and is held in position by a nut 20, threaded onto the reduced end of the brake shaft.

The left-hand end of the brake shaft 17 is provided with a crank arm 21, which fits snugly over the squared left-hand end of the shaft and is held in position by a nut 22, threaded upon the shaft. The upper end of the crank arm 21 is connected to the upper end of the bell crank brake shoe lever 11, upon the left-hand side of the wagon by a connecting rod 23 similar in construction to the corresponding connecting rod upon the right-hand side of the wagon. Each of the connecting rods 15 and 23 is composed of two parts, the adjacent ends of which overlap and are provided with spaced slots or apertures 25 to receive bolts 26, by which the parts are adjustably and rigidly held together. By changing the slots into which the bolts 26 are inserted the length of the connecting rods may be adjusted.

The handle bar 16 for actuating the brake is provided adjacent its upper end and upon the inside thereof with a bent thumb lever 30, which has a short arm 31 extending forwardly transversely of the handle bar 16, and pivoted intermediate of its ends at 32 to the inner side of the handle bar. From the short arm 31, the lever extends upwardly in a plane substantially parallel with the handle bar and is turned outwardly at its upper end adjacent the upper end of the handle bar to form a convenient thumb piece 33. A vertical tie rod 34 is pivoted at its upper end to the rear end of the short arm 31 of the thumb lever and is pivoted at its lower end to the upper end of a vertically slidable pawl 34'; carried by the handle bar. The flat tie rod 34 is twisted centrally through one quarter of a turn, the plane of the upper portion of the rod being substantially parallel to the plane of the handle bar 16. The pawl 34' is arranged to engage with the teeth 35 of the segmental rack 36, which is rigidly secured to the body of the wagon by means of the horizontal yoke 37, which is fastened to the wagon by rivets 38, or other means.

The teeth 35 of the segmental rack 36 face rearwardly of the wagon to prevent the forward movement of the handle bar 16, and a corresponding forward movement of the brake shoes 10. The pawl 34' of the handle bar is held yieldingly in an engagement with the teeth of the rack by means of a spiral spring 38, which surrounds a vertical pin 39, the upper end of which is pivoted to the rear end of the short arm of the thumb lever 30, and the lower end of which rests slidably in a bracket 40, rigid with the handle bar 16.

The connecting rods 15 and 23 are preferably curved upwardly from their forward ends to permit of a long leverage being given to the action upon the brake shoe. The bell crank levers connected to the brake shoes being convex in a direction toward the brake shoes are stronger than straight levers of the same dimensions would be. The connecting rods 15 and 23 being adjustable, may be lengthened as the brake shoes wear to maintain the handle bar 16 normally in a convenient position in front of the seat 18. By using a bell crank lever pivoted at its lower end and having the brake shoe intermediate of its ends, a much more powerful construction is possible than when the lever is pivoted intermediate of its ends and the brake shoe applied to one end of the lever, as is usually the case.

Although I have shown only one form in which this brake may be constructed, it is evident that many changes might be made to adapt the brake to various styles of vehicles, or for other purposes, without departing from the spirit of this invention or the scope of the appended claims.

Having thus described the invention, I claim,—

1. In a vehicle, a brake comprising a bracket depending rigidly from the body of the vehicle in front of a wheel thereof, a bell crank lever pivoted at one end to the lower end of said bracket and extending upwardly therefrom, and a brake shoe attached to said lever adjacent and upon the convex side of the apex thereof.

2. In a vehicle, a brake comprising a bracket depending rigidly from the body of the vehicle in front of a wheel thereof, a bell crank lever pivoted at one end to the lower end of said bracket and extending upwardly therefrom, a brake shoe attached to said lever adjacent the apex thereof, a bar pivoted to the vehicle, and a connecting rod between said bar and the upper end of said bell crank lever for actuating said brake.

In witness whereof I have hereunto set my hand this 14th day of January, A. D. 1909.

JOHN LUZNICKY.

Witnesses:
HUGH McHENRY,
A. I. GARDNER.